(12) United States Patent
Riggle

(10) Patent No.: US 7,017,253 B1
(45) Date of Patent: Mar. 28, 2006

(54) CULVERT BAND INSTALLATION TOOL

(76) Inventor: Robert T. Riggle, P.O. Box 1673, 3359 Brush Creek Rd., Eagle, CO (US) 81631

( * ) Notice: Subject to any disclaimer, the term of this patent is extended or adjusted under 35 U.S.C. 154(b) by 450 days.

(21) Appl. No.: 10/404,751

(22) Filed: Apr. 1, 2003

(51) Int. Cl.
B23P 19/04 (2006.01)
(52) U.S. Cl. .................... 29/468; 29/258; 29/266; 29/256; 269/276; 285/39; 285/903
(58) Field of Classification Search ............... 29/468, 29/525.02, 266, 256
See application file for complete search history.

(56) References Cited

U.S. PATENT DOCUMENTS

| 2,787,442 | A | | 4/1957 | Lewis |
| 2,990,738 | A | * | 7/1961 | Zysset ..................... 269/97 |
| 3,051,444 | A | * | 8/1962 | Stephenson ................ 254/231 |
| 3,108,783 | A | | 10/1963 | Foust, et al. |
| 4,091,694 | A | | 5/1978 | Parrish |
| 4,583,724 | A | * | 4/1986 | Huang ..................... 269/88 |
| 5,052,608 | A | | 10/1991 | McClure |
| 5,383,693 | A | * | 1/1995 | Shade ..................... 285/373 |
| 6,672,578 | B1 | * | 1/2004 | Martens ................... 269/282 |

* cited by examiner

Primary Examiner—Marc Jimenez
Assistant Examiner—Christopher Agrawal
(74) Attorney, Agent, or Firm—Sturm & Fix LLP

(57) ABSTRACT

A culvert band installation tool includes two end plates that are substantially parallel to one another and a bolt to draw the end plates together facilitating the culvert band installation process. The ends plates are maintained substantially parallel to one another by using slip shafts that pass through long sleeves that pass through holes in the end plates. The slip shafts are substantially parallel to the bolt. Indexing pins are installed in the end plates that engage holes in the flanges of the culvert band. A band is installed by using the culvert installation tool to clamp the flanges sufficiently close together to fasten with carriage bolts.

9 Claims, 5 Drawing Sheets

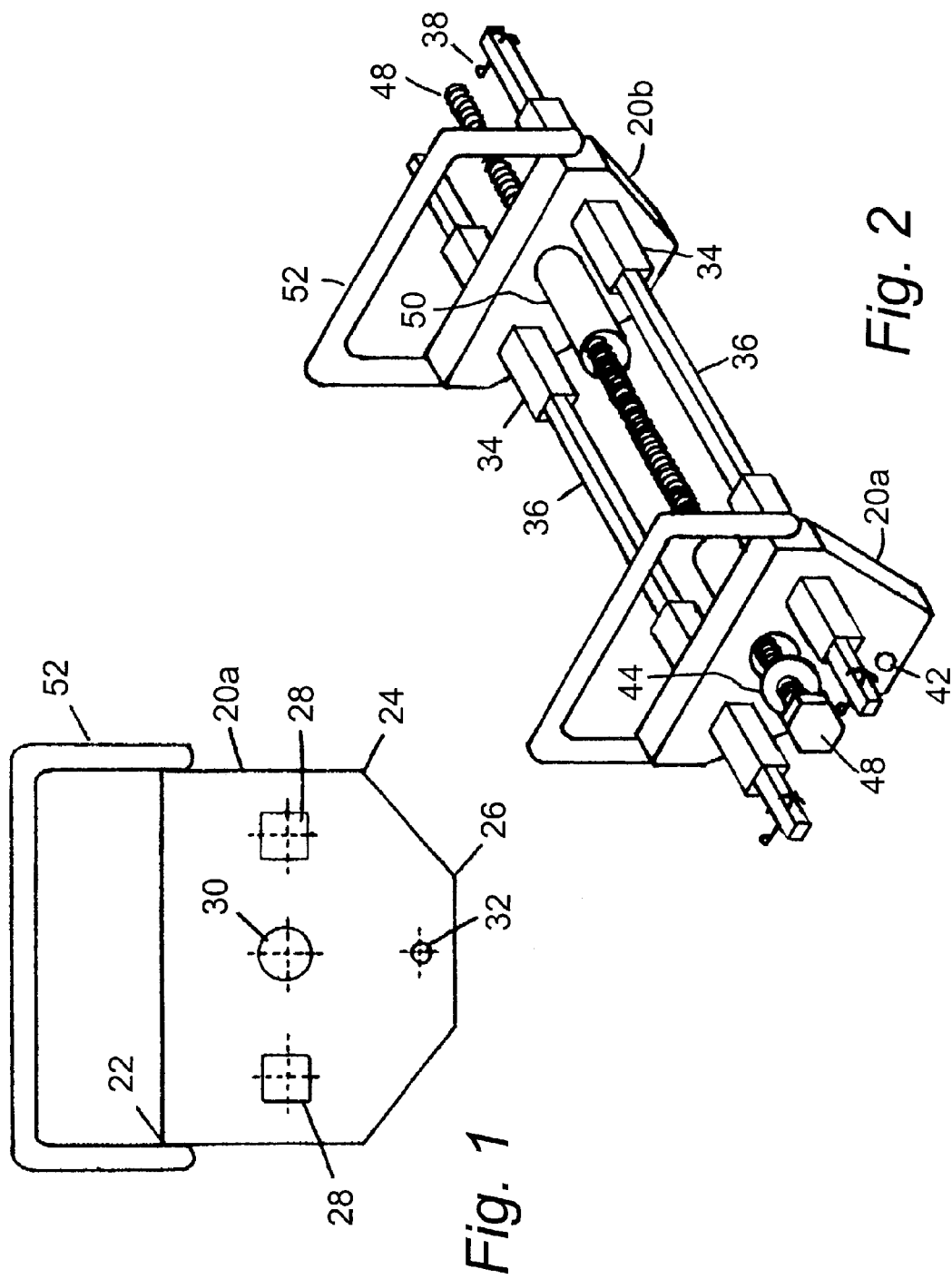

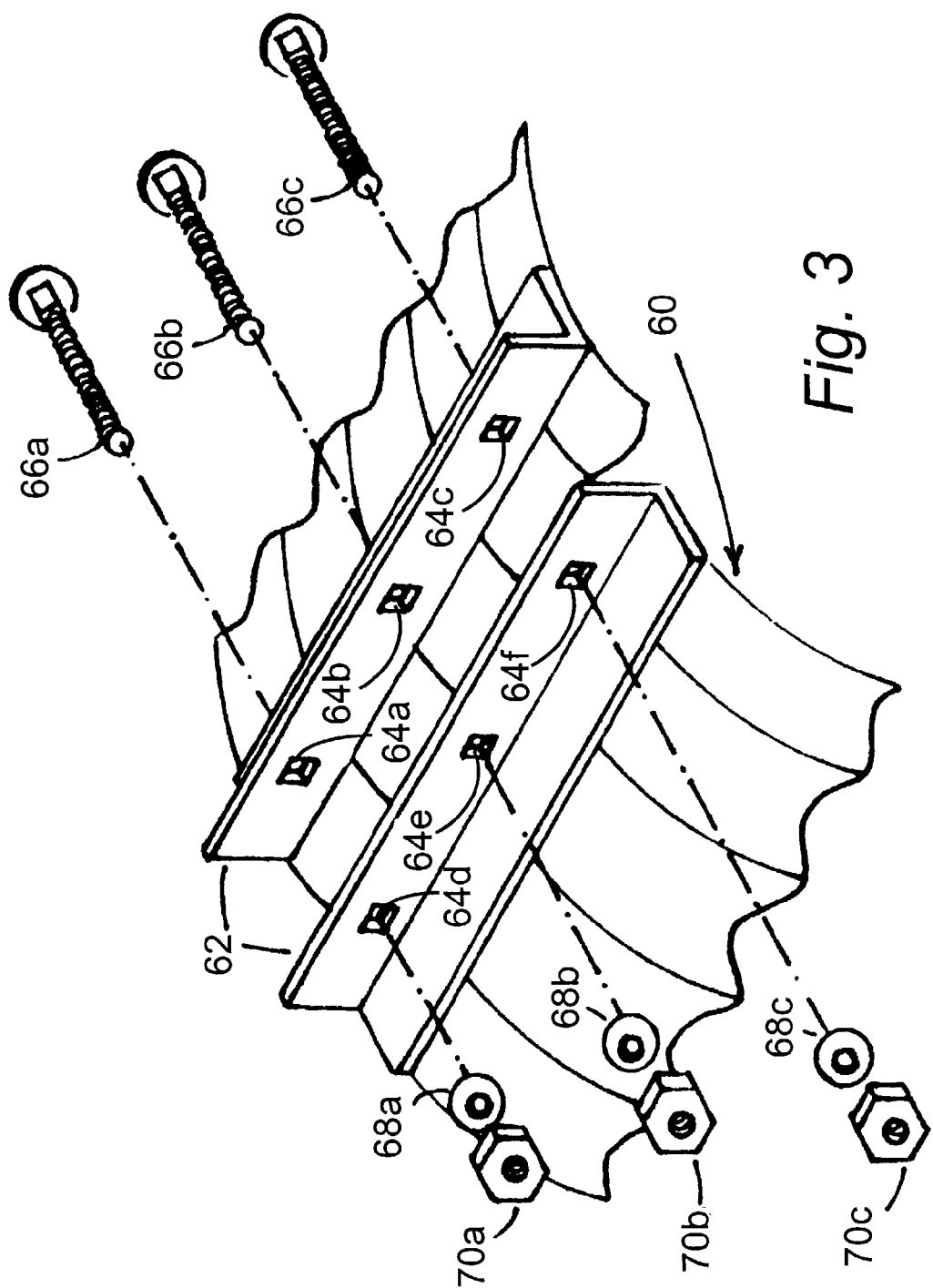

CULVERT BAND INSTALLATION TOOL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a tool. More particularly the present invention relates to a tool for installing culvert bands.

2. Background Art

Galvanized, corrugated culverts are used under railroad right of ways, roads, driveways, and anyplace drainage is required. Adjoining culverts are connected via a culvert band which overlaps the ends of the two culverts. The band is a corrugated sleeve that has been split, the split ends having flanges on the free ends so the sleeve can be drawn into a full circle with a bolt or bolts.

A culvert band installation tool allows an individual to install the culvert bands on the corrugated culvert. In the past, a length of "all-thread" was used for banding two corrugated culverts. An installer using all-thread lacks control and the process may be dangerous. Two installers must be present when using all-thread for banding corrugated culvert. The installation can be time-consuming, depending on the size of the culvert band being installed.

A tool for contracting culvert bands was disclosed in U.S. Pat. No. 2,787,442. The culvert band is contracted by applying a force to a lever. The force results in a contraction of "jaws" made to draw the ends of the culvert band together. Some method of stabilizing the culvert band must be incorporated in the installation using this tool because, when force is applied to the lever, the culvert band will tend to rotate around the culverts. Too, a significant amount of room must be available to operate this tool as the lever is, necessarily, quite long.

Another tool for pulling together and spreading spaced flanges is revealed in U.S. Pat. No. 3,108,783. This tool operates like a caliper, having a screw connected to a hand-wheel providing the mechanical advantage required to band culverts with a culvert band. Because the ends of the calipers that engage the flanges necessarily pivot on the calipers, the flanges of a culvert band may tend to bend so the top edges are closer to each other than the bottom edges.

A tool for drawing the ends of a pipe repair clamp (not a culvert band) together is introduced in U.S. Pat. No. 4,091,694. The tool has a two-stage operation. The first stage is for rapidly taking up any slack that might be in the repair clamp. The second is carried out with a screw and is for applying the necessary force for tightening the clamp on the pipe being repaired. The screw engages a scissor-type linkage that provides additional mechanical advantage beyond that of the screw.

There is, therefore, a need for a method and device for joining two corrugated culverts with a culvert band that can be carried out quickly by a single operator. There is an additional need for a safe method and apparatus for joining two corrugated culverts with a culvert band.

BRIEF SUMMARY OF THE INVENTION

A purpose of this invention is to provide a simple, rugged method and apparatus for adjoining corrugated culverts with a culvert band. An additional purpose of the invention is for a device that can be operated by a single operator to band corrugated culverts.

The present invention comprises two end plates, substantially parallel to one another. These plates may be drawn together by turning a bolt that has been threaded into one plate, preferably through a nut that is welded to the plate. The plates remain largely parallel to one another by slip shafts (preferably two) that pass through sleeves incorporated in the two end plates. Because of the length of the sleeves and rigidity of the slip shafts, the plates are held perpendicular to the slip shafts, and so, parallel to one another.

Near the lower side of both the two end plates, indexing pins protrude, facing into the region between the end plates. These indexing pins each engage a hole in the culvert clamp flanges, one on each side as the flanges are being pulled together.

After engaging the indexing pins into the holes on opposite flanges of the culvert band, the bolt is turned with a wrench to cause the end plates to draw toward one another. As the end plates draw together, they push the culvert band flanges together, as well. When the culvert band flanges are sufficiently close, carriage bolts may be passed through additional holes in the flanges. Nuts are then turned on the carriage bolts and tightened down to hold the culvert band securely while the culvert band clamp is removed by turning the bolt in the opposite direction required for drawing the end plates together. An additional carriage bolt is then passed through the holes the indexing pins had been filling, and a nut engaged to this last bolt. All the nuts may then be tightened down to stabilize the culverts and the culvert band.

The novel features which are believed to be characteristic of this invention, both as to its organization and method operation together with further objectives and advantages thereto, will be better understood from the following description considered in connection with accompanying drawings in which a presently preferred embodiment of the invention is illustrated by way of example. It is to be expressly understood however, that the drawings are for the purpose of illustration and description only and not intended as a definition of the limits of the invention.

BRIEF DESCRIPTION OF THE SEVERAL VIEWS OF THE DRAWINGS

FIG. 1 is a front elevation view of one end plate;

FIG. 2 is a perspective view of a culvert band clamping tool,

FIG. 3 is a perspective view of a culvert band with three bolts used to secure the same;

DETAILED DESCRIPTION OF THE INVENTION

Figure 4:
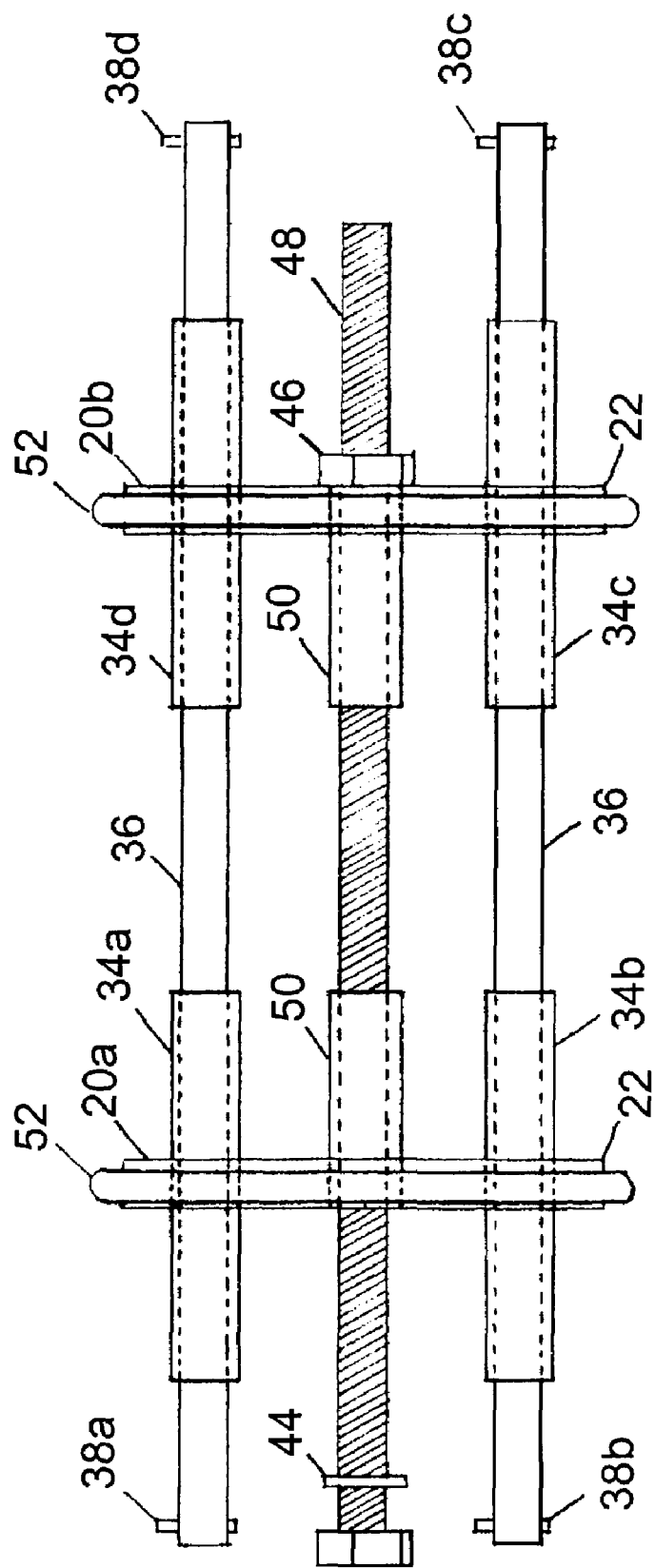
FIG. 4 is a top plan view of the culvert band clamping tool.

Referring to the detail of a culvert band installation tool end plates 20a and 20b in FIGS. 1 and 2, each end plate 20a, 20b is a rectangle with the lower corners of the rectangle removed. Each end plate 20a, 20b has upper corners 22, lower corners 24, bottom corners 26, side bores 28, a center bore 30, a bottom bore 32, and a handle 52. The side bores 28 have long sleeves 34 incorporated with them. These long sleeves 34 may pass through the side bores 28 or be affixed to either side of the end plate 20a, 20b with the side bores 28 extended between the long sleeves 34. The center bores 30 have short sleeves 50 incorporated with them. The indexing pins 42 engage into the bottom bores 32 in the end plates 20a, 20b.

The culvert band installation tool is shown in perspective in FIG. 2. The device includes three main components: end plates 20a, 20b, slip shafts 36, and a bolt 48. The two long slip shafts 36 are perpendicular to and run lengthwise between the two end plates 20a, 20b. The slip shafts 36 are shown square in cross-section, but this invention is not limited to that cross-sectional shape. The slip shafts 36 pass through the long sleeves 34 incorporated with the side bores 28. The slip shafts 36 have keeper pins 38 placed in small holes 39 at each end of each slip shaft 36. The keeper pins 38 keep the long slip shafts 36 from sliding completely through the long sleeves 34.

A bolt 48 runs between the end plates 20a, 20b substantially parallel to the long slip shafts 36. The bolt passes through the center hole 30 in each end plate 20a, 20b and a bonded nut 46 (FIGS. 4–6) which is welded to the foot end plate 20b. A washer 44 is placed between the bolt's 48 head and the outside of the head end plate 20a.

A partial view of a typical culvert band 60 is depicted in FIG. 3 to help explain its installation around two culvert pipe ends. In order to operate a culvert band installation tool, the indexing pins 42 are placed into the two center square cut holes 64b and 64e of the flanges 62 of the culvert band 60. Using a wrench, the operator turns the head of the bolt 48 clockwise, from the perspective of one facing the bolt 48, in order to draw the end plates 20a, 20b together. As the two plates 20a, 20b draw toward one another, the two flanges 62 on the culvert band 60 are also drawn together, being between the end plates 20a, 20b. When the two flanges 62 come sufficiently close together, two carriage bolts 66a, 66c can be placed into their corresponding holes 64a, 64d; 64c, 64f. Two nuts 70a, 70c and two washers 68a, 68c are installed on the end of the carriage bolts 66a and 66c. The installation of the carriage bolts 66a and 66c will hold the flanges 62 together and the apparatus can be backed off or opened by turning the bolt 48 counterclockwise, from the perspective of one facing the bolt head, and thus drawing the plates 20a and 20b back apart. When the two plates 20a and 20b have drawn adequately apart, the culvert band installation tool is removed from the culvert band 60. The installation of the culvert band 60 is finished by installing the middle carriage bolt 66b, nut 70b and washer 68b.

FIG. 4 illustrates the culvert band installation tool from the top. The long sleeves 34a–34d and the short sleeves 50 are clearly seen. The bonded nut 46 is also plain in FIG. 4.

Figure 5:
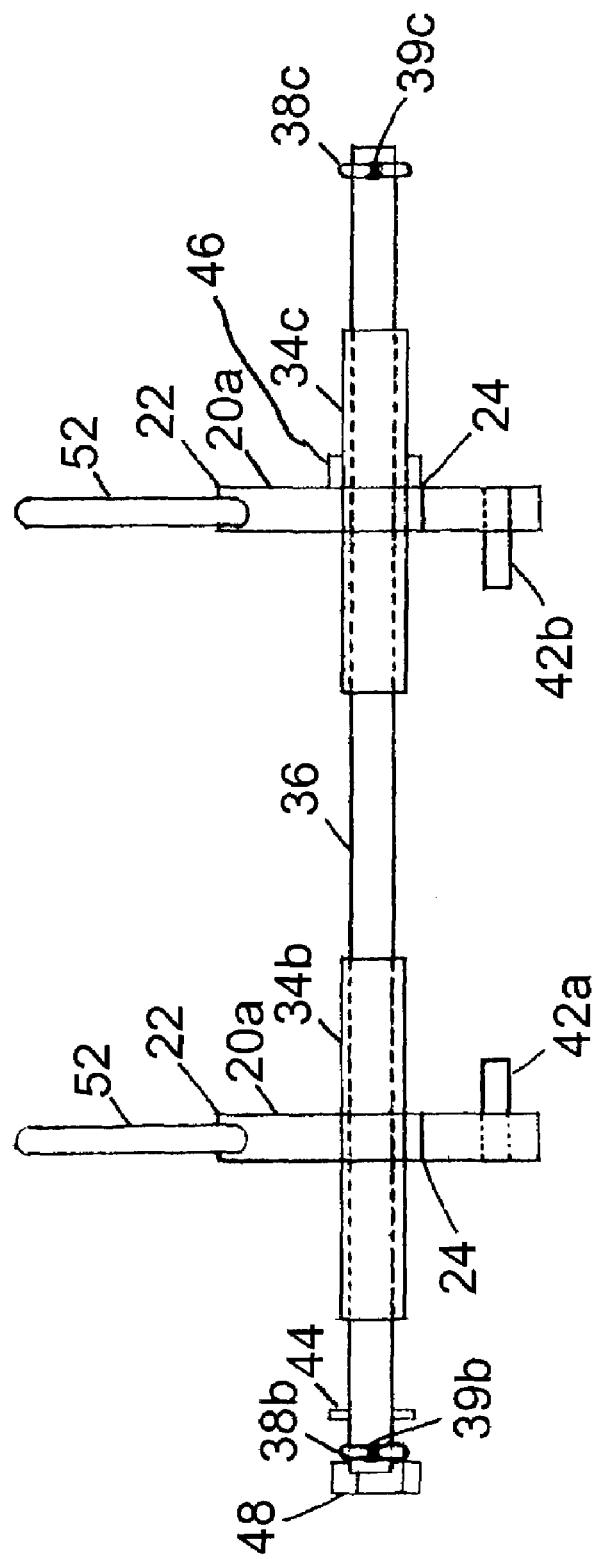
FIG. 5 is a side elevation view thereof.

In FIG. 5, the culvert band installation tool is seen from the side. The indexing pins 42a, 42b are seen near the bottom of each end plate 20a, 20b.

Figure 6:
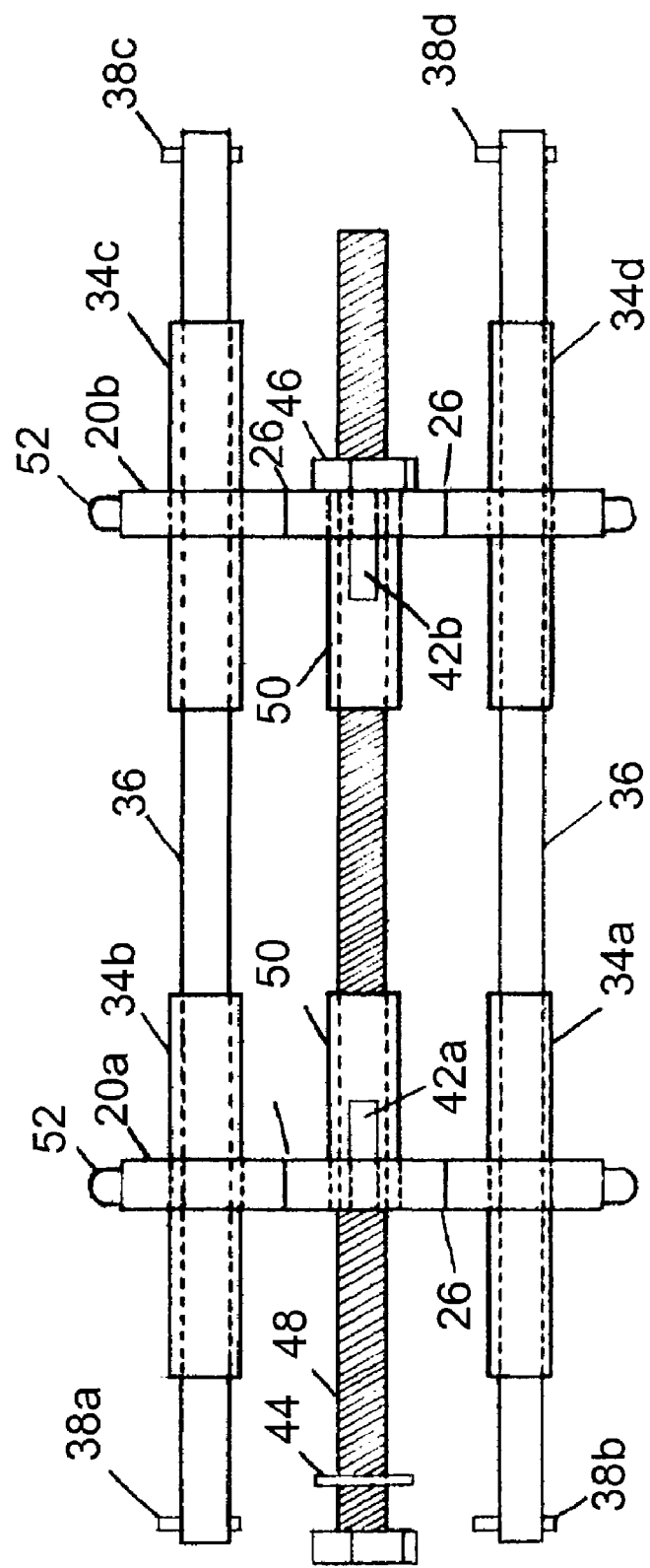
FIG. 6 is a bottom plan view thereof.

Looking from the bottom in FIG. 6, details of the culvert band installation tool can be seen from another angle.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method for banding two culverts together with a culvert band having flanged ends by using a culvert banding tool comprising two substantially parallel end plates drawn together with a bolt which is substantially perpendicular to the two end plates, the method comprising the steps of:
   drawing two flanged ends of the culvert band together with the culvert banding tool by turning the bolt; and
   fastening said culvert band's flanged ends together when the flanged ends have been drawn sufficiently close together;
   wherein at least one indexing pin protrudes from each of the end plates, each indexing pin engaging a hole in one of the two flanged ends of the culvert band.

2. The method of claim 1 wherein the two flanged ends or the culvert band are fastened using carriage bolts.

3. The method of claim 1 wherein the two end plates are kept substantially parallel to one another by at least one slip shaft passing through holes in each end plates and is substantially perpendicular to the end plates.

4. The method of claim 3 wherein at least one slip shaft passes through a long sleeve at each end plate.

5. The method of claim 1 wherein the bolt has a hex-head to engage a wrench.

6. A method for banding two culverts together with a culvert band having flanged ends by using a culvert banding tool comprising two substantially parallel end plates drawn together with a bolt which is substantially perpendicular to the two end plates, the method comprising the steps of:
   drawing two flanged ends of the culvert band together with the culvert banding tool by turning the bolt; and
   fastening said culvert band's flanged ends together when then flanged ends have been drawn sufficiently close together,
   wherein the two end plates are kept substantially parallel to one another by at least one slip shaft passing through holes in each end plate and is substantially perpendicular to the end plates.

7. The method of claim 6 wherein the two flanged ends of the culvert band are fastened using carriage bolts.

8. The method of claim 6 wherein the at least one slip shaft passes through a long sleeve at each end plate.

9. The method of claim 6 wherein the bolt has a hex-head to engage a wrench.

* * * * *